United States Patent
Chen et al.

(10) Patent No.: US 9,521,503 B2
(45) Date of Patent: Dec. 13, 2016

(54) AUDIO PLAYER WITH BLUETOOTH FUNCTION AND AUDIO PLAYING METHOD THEREOF

(71) Applicant: ISSC TECHNOLOGIES CORP., Hsinchu (TW)

(72) Inventors: Guan-Chiun Chen, Miaoli County (TW); Chung-I Lee, Hsinchu County (TW)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 14/511,264

(22) Filed: Oct. 10, 2014

(65) Prior Publication Data

US 2015/0319556 A1    Nov. 5, 2015

(30) Foreign Application Priority Data

Apr. 30, 2014    (TW) .............................. 103115527 A

(51) Int. Cl.
*H04W 4/00* (2009.01)
*H04W 56/00* (2009.01)

(52) U.S. Cl.
CPC ............... *H04W 4/00* (2013.01); *H04W 4/008* (2013.01); *H04W 56/00* (2013.01)

(58) Field of Classification Search
CPC . H04W 4/008; H04W 56/00; H04R 2227/003; H04R 2227/005; H04R 3/12; G06F 3/16; G06F 3/165; H04H 60/04; H04N 5/04; H04N 21/4307; H04N 21/43615
See application file for complete search history.

(56) References Cited

U.S. PATENT DOCUMENTS

| | | | | |
|---|---|---|---|---|
| 7,539,551 B2* | 5/2009 | Komura | .................... | H04S 1/00 455/3.06 |
| 7,747,338 B2* | 6/2010 | Korhonen | ........... | H04M 1/7253 455/3.06 |
| 7,805,210 B2* | 9/2010 | Cucos | ....................... | H04J 3/07 700/94 |
| 8,433,243 B2* | 4/2013 | Sharma | ................... | H04M 1/05 455/41.2 |

(Continued)

OTHER PUBLICATIONS

Taiwan Office Action, Application No. 103115527, 7 pages, Dec. 28, 2015.

*Primary Examiner* — Lewis West
(74) *Attorney, Agent, or Firm* — Slayden Grubert Beard PLLC

(57) ABSTRACT

An audio player with a Bluetooth function and an audio playing method thereof are provided. The audio player includes a master Bluetooth speaker and a plurality of slave Bluetooth speakers. The master Bluetooth speaker receives and decodes a compressed digital audio to generate a decoded time. The slave Bluetooth speakers receive and decode the compressed digital audio to generate another decoded time. After the slave Bluetooth speakers receive the decoded time from master Bluetooth speaker and determine a time difference between the master Bluetooth speaker and the slave Bluetooth speakers, the slave Bluetooth speakers adjust timing for playing an audio from each of the slave Bluetooth speakers. Therefore, the timing for playing the audio from each of the slave Bluetooth speakers can synchronize timing for playing audio from the master Bluetooth speaker.

20 Claims, 6 Drawing Sheets

(56) References Cited

U.S. PATENT DOCUMENTS 9,158,327 B2 * 10/2015 Millington ............ H04J 3/0664
2009/0298420 A1 * 12/2009 Haartsen ............... H04J 3/0658
　　　　　　　　　　　　　　　　　　　　455/3.06

* cited by examiner

AUDIO PLAYER WITH BLUETOOTH FUNCTION AND AUDIO PLAYING METHOD THEREOF

BACKGROUND

1. Technical Field

The present disclosure relates to an audio player and an audio playing method thereof, in particular, to an audio player with a Bluetooth function and an audio playing method thereof.

2. Description of Related Art

Generally speaking, when a user wants to play sound from many Bluetooth speakers simultaneously, the method combines a master speaker with a Bluetooth function and many slave speakers with the Bluetooth function to play sound synchronously. The method for synchronously playing sound is described as follows. Firstly, the master speaker receives a digital compression audio transmitted from a smartphone or a music player with the Bluetooth function. Next, the master speaker transmits the digital compression audio to the slave speakers. The master speaker and the slave speakers decode the digital compression audio respectively. Then transforming the decoded digital compression audio by digital to analog (D/A) converters of the master speaker and the slave speakers to achieve the effect of playing in many Bluetooth speakers synchronously.

However, the communication among the Bluetooth speakers is a wireless transmission system. It is difficult to reach the clock synchronization for the Bluetooth speakers, so that the Bluetooth speakers play sound asynchronously. The synchronous effect is worse even if reaching the clock synchronization for the Bluetooth speakers. Therefore, when the master speaker and the slave speakers reach the purpose of synchronously playing sound by the clock synchronization method, their output sound may also have the obvious asynchronization to cause the user to hear sounds uncomfortably.

SUMMARY

An exemplary embodiment of the instant disclosure provides an audio player with a Bluetooth function. The audio player includes a master Bluetooth speaker and a plurality of slave Bluetooth speakers. The master Bluetooth speaker is configured for having a Bluetooth field, receiving a digital compression audio, and decoding the digital compression audio to generate a master decoded audio and a master decoded time corresponding to the master decoded audio. The slave Bluetooth speakers are disposed in the Bluetooth field to receive the digital compression audio. The slave Bluetooth speakers receive the master decoded time after generating the master decoded time by the master Bluetooth speaker, wherein each slave Bluetooth speaker decodes the digital compression audio to generate a slave decoded audio and a slave decoded time corresponding to the slave decoded audio. Each slave Bluetooth speaker includes a processor and a compensation element. The processor is configured for receiving the master decoded time and the slave decoded time and determining a time difference between the master decoded time and the slave decoded time to generate a compensated signal indicating the time difference. The compensation element is electrically connected to the processor. The compensation element is configured for receiving the compensated signal and the slave decoded audio, wherein the compensation element adjusts the slave decoded audio based on the compensated signal to synchronize the slave decoded audio and the master decoded audio and accordingly generates a compensated audio. When the master Bluetooth speaker analogizes the master decoded audio to play the analog master decoded audio, the slave Bluetooth speaker analogizes the compensated audio to synchronously play the analog compensated audio.

An exemplary embodiment of the instant disclosure provides an audio playing method with a Bluetooth function. The audio playing method is adapted for an audio player with the Bluetooth function. The audio player has a master Bluetooth speaker and a plurality of slave Bluetooth speakers. The master Bluetooth speaker has a Bluetooth field and the slave Bluetooth speakers are disposed in the Bluetooth field. The audio playing method includes the following steps: receiving a digital compression audio and transmitting the digital compression audio to the slave Bluetooth speaker in the master Bluetooth speaker; decoding the digital compression audio to generate a master decoded audio and a master decoded time corresponding to the master decoded audio in the master Bluetooth speaker; receiving the digital compression audio transmitted from the master Bluetooth speaker and receiving the master decoded time after the master Bluetooth speaker generates the master decoded time in each slave Bluetooth speaker; decoding the digital compression audio to generate a slave decoded audio and a slave decoded time corresponding to the slave decoded audio in each slave Bluetooth speaker; determining a time difference between the master decoded time and the slave decoded time to generate a compensated signal indicating the time difference in each slave Bluetooth speaker; and adjusting the slave decoded audio based on the compensated signal in each slave Bluetooth speaker to synchronize the slave decoded audio and the master decoded audio and accordingly generate a compensated audio. When the master Bluetooth speaker analogizes the master decoded audio to play the analog master decoded audio, the slave Bluetooth speaker analogizes the compensated audio to synchronously play the analog compensated audio.

To sum up, the exemplary embodiments of the instant disclosure provide the audio player with the Bluetooth function and the audio playing method thereof, to further adjust the timing of each slave Bluetooth speaker playing the sound by the master decoded time generated from the master Bluetooth speaker decoding the digital compression audio and the slave decoded time generated from each slave Bluetooth speaker decoding the digital compression audio. Therefore, the timing of each slave Bluetooth speaker playing the sound is synchronous to that of the master Bluetooth speaker playing the sound.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
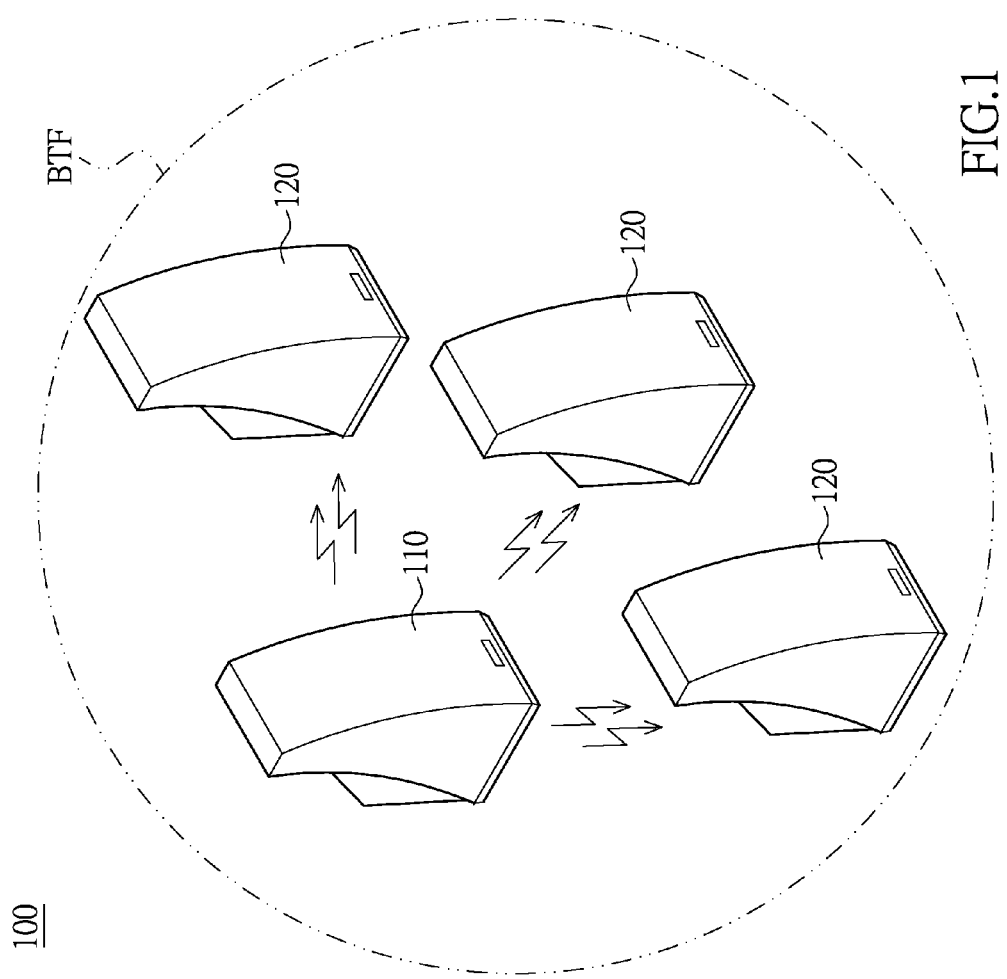
FIG. 1 is a schematic view of an audio player with a Bluetooth function according to an exemplary embodiment of the instant disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Please refer to FIG. 1, which is a schematic view of an audio player with a Bluetooth function according to an exemplary embodiment of the instant disclosure. As shown in FIG. 1, an audio player 100 with a Bluetooth function includes a master Bluetooth speaker 110 and many slave Bluetooth speakers 120. The master Bluetooth speaker 110 has a Bluetooth field BTF. The slave Bluetooth speakers 120 are disposed in the Bluetooth field BTF. Therefore, in the Bluetooth field BTF, the master Bluetooth speaker 110 and the slave Bluetooth speakers 120 can communicate the sound data with each other to synchronously play the sound. In the instant disclosure, the audio player 100 is a Bluetooth speaker set, wherein the master Bluetooth speaker 110 is the master speaker with the Bluetooth function and the slave Bluetooth speakers 120 are the slave speakers with the Bluetooth function.

Therefore, when the master Bluetooth speaker 110 (i.e., the master speaker) receives a digital compression audio transmitted from an external audio player with the Bluetooth function (not shown in FIGs), the master Bluetooth speaker 110 immediately transmits the digital compression audio to each slave Bluetooth speaker 120 (i.e., the slave speakers), so that the master Bluetooth speaker 110 and the slave Bluetooth speakers 120 can execute the related audio processing to play the sound synchronously. In the instant disclosure, the external audio player can be a smart phone, music player with the Bluetooth function, or other devices transmitting the digital compression audio by the Bluetooth technology, the instant disclosure is not limited thereto.

The specific implementation method for the related audio processing will be described in the later embodiments, which are described as follows.

Figure 2A:
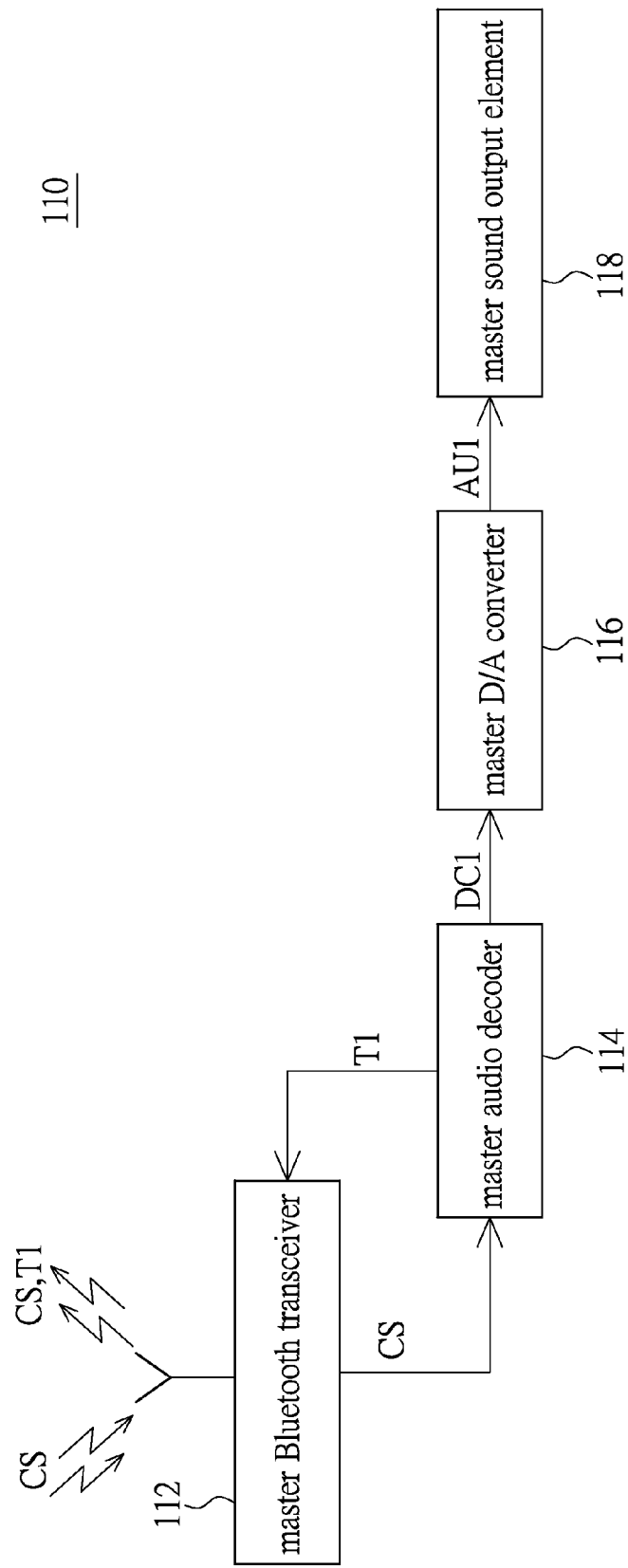
FIG. 2A is a schematic view of a master Bluetooth speaker according to an exemplary embodiment of the instant disclosure.
Figure 2B:
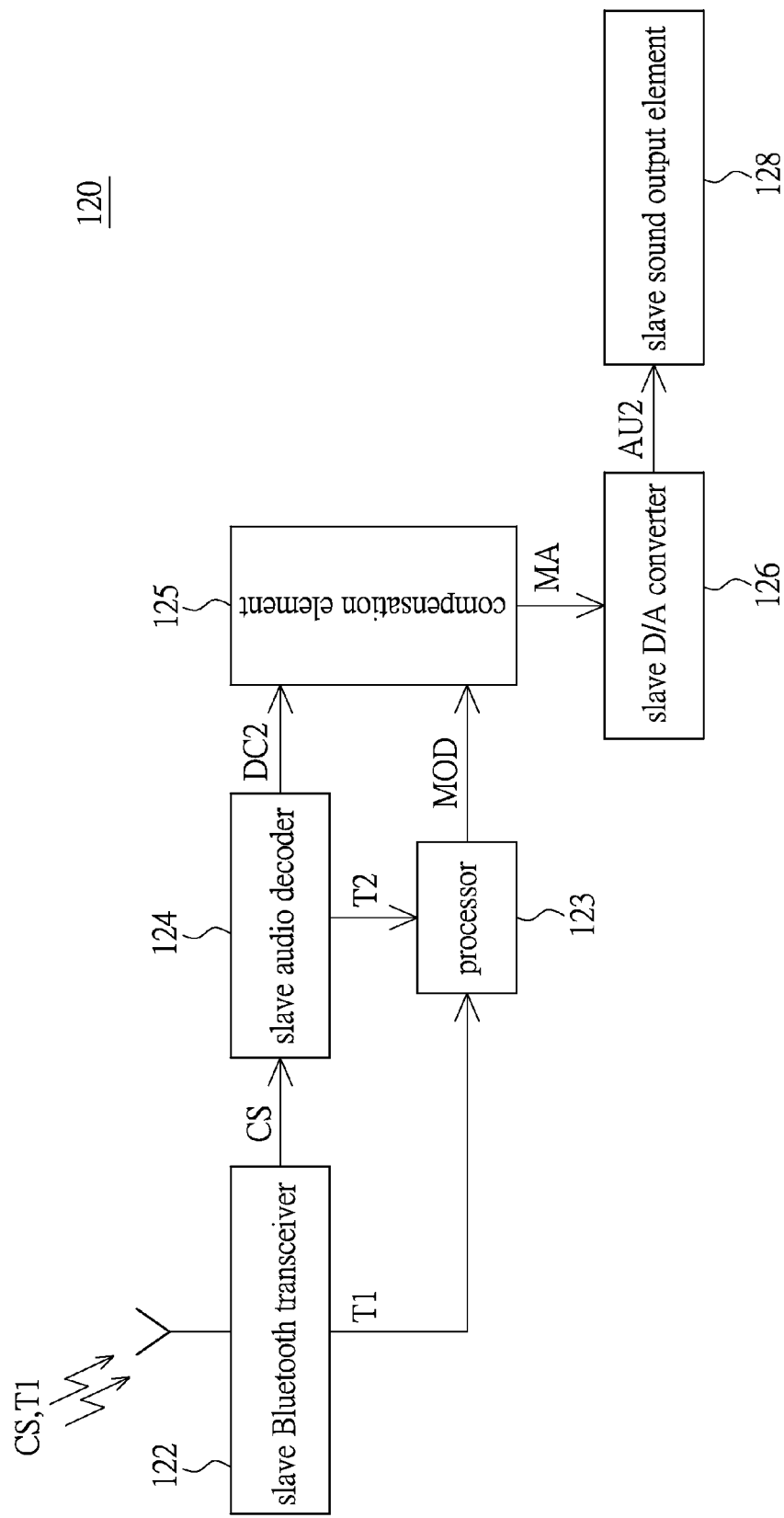
FIG. 2B is a schematic view of a slave Bluetooth speaker according to an exemplary embodiment of the instant disclosure.

Please refer to FIG. 2A and FIG. 2B in conjunction with FIG. 1. As shown in FIG. 2A, the master Bluetooth speaker 110 receives the digital compression audio CS from the external audio player and decodes the digital compression audio CS to generate the master decoded audio DC1 and the master decoded time T1 corresponding to the master decoded audio DC1. In the instant disclosure, the master decoded time T1 can be a start time (which is defined as a master start time) of the master Bluetooth speaker 110 starting decoding the digital compression audio CS, a finish time (which is defined as a master finish time) of the master Bluetooth speaker 110 finishing decoding the digital compression audio CS, or other times indicating the master decoded time T1, the instant disclosure is not limited thereto. Next, the master Bluetooth speaker 110 analogizes the master decoded audio DC1 to play the analog master decoded audio DC1, and accordingly plays the sound corresponding to the analog master decoded audio DC1.

In the instant disclosure, the master Bluetooth speaker 110 includes a master audio decoder 114, a master digital to analog (D/A) converter 116, and a master sound output element 118. The master audio decoder 114 receives the digital compression audio CS by a master Bluetooth transceiver 112 and further decodes the digital compression audio CS to generate the master decoded audio DC1 and the master decoded time T1. Then the master audio decoder 114 outputs the master decoded time T1 to the slave Bluetooth speaker 120 by the master Bluetooth transceiver 112 after the master Bluetooth speaker 110 generates the master decoded time T1.

Therefore, when the master decoded time T1 is the master start time, the master audio decoder 114 outputs the master decoded time T1 by the master Bluetooth transceiver 112 after the master audio decoder 114 starts decoding the digital compression audio CS for a period of time. When the master decoded time T1 is the master finish time, the master audio decoder 114 outputs the master decoded time T1 by the master Bluetooth transceiver 112 after the master audio decoder 114 finishes decoding the digital compression audio CS for a period of time.

The master D/A converter 116 is electrically connected between the master audio decoder 114 and the master sound output element 118. The master D/A converter 116 receives the master decoded audio DC1 and analogizes the master decoded audio DC1 to generate a master sound signal AU1 indicating the analog master decoded audio DC1. The master sound output element 118 receives and plays the master sound signal AU1 to play the sound corresponding to the master sound signal AU1. Generally, the procedures of the master D/A converter 116 analogizing the master decoded audio DC1 and the master sound output element 118 playing the sound are executed after the speaker decodes the sound signal. Those skilled in the art shall know the implementation of the master D/A converter 116 and the master sound output element 118, and further descriptions are hereby omitted.

As shown in FIG. 2B, the master Bluetooth speaker 110 transmits the digital compression audio CS to the slave Bluetooth speakers 120 after the master Bluetooth speaker 110 receives the digital compression audio CS from the external audio player. Then each slave Bluetooth speaker 120 receives the digital compression audio CS transmitted from the master Bluetooth speaker 110 and decodes the digital compression audio CS to generate a slave decoded audio DC2 and a slave decoded time T2 corresponding to the slave decoded audio DC2. Besides, each slave Bluetooth speaker 120 also receives the master decoded time T1 after the master Bluetooth speaker 110 generates the master decoded time T1.

In the instant disclosure, each slave Bluetooth speaker 120 includes a processor 123, a slave audio decoder 124, a compensation element 125, a slave digital to analog (D/A) converter 126, and a slave sound output element 128. The slave audio decoder 124 is electrically connected between the processor 123 and the compensation element 125. The processor 123 is electrically connected to the compensation element 125. The slave audio decoder 124 receives the digital compression audio CS transmitted from the master Bluetooth speaker 110 by the slave Bluetooth transceiver 122 and then decodes the digital compression audio CS to generate the slave decoded audio DC2 to the compensation element 125 and to generate the slave decoded time T2 to the processor 123.

In order to make sure that the slave Bluetooth speaker 120 receives the digital compression audio CS or the master decoded time T1 transmitted from the master Bluetooth speaker 110, each slave Bluetooth speaker 120 returns an acknowledged signal (not shown in FIGs) to the master Bluetooth speaker 110 after the master Bluetooth speaker 110 transmits the digital compression audio CS or the master decoded time T1 to the slave Bluetooth speakers 120. Accordingly, the master Bluetooth speaker 110 can know the situation of each slave Bluetooth speaker 120 receiving the digital compression audio CS or the master decoded time T1.

In the instant disclosure, the acknowledged signal indicates whether the corresponding slave Bluetooth speaker 120 receives the digital compression audio or the master decoded time transmitted from the master Bluetooth speaker 110. For example, when the master Bluetooth speaker 110 receives the acknowledged signal indicating that the slave Bluetooth speaker 120 does not receive the digital compression audio CS, the master Bluetooth speaker 110 may transmit the digital compression audio CS to the slave Bluetooth speakers 120 again. Preferably, the signal processing of the acknowledged signal can be arranged in the master Bluetooth transceiver 112 and the slave Bluetooth transceiver 212 or can be arranged in other devices, the instant disclosure is not limited thereto.

It is worth to note that the processor 123 receives the master decoded time T1 and the slave decoded time T2 and then determines a time difference between the master decoded time T1 and the slave decoded time T2 to generate a compensated signal MOD indicating the time difference. In the instant disclosure, there is a corresponding relationship between the master decoded time T1 and the slave decoded time T2, thereby the processor 123 can determine the time difference between the master decoded time T1 and the slave decoded time T2 at the same standard. It means that when the master decoded time T1 is a start time of the master Bluetooth speaker 110 starting decoding the digital compression audio CS, the slave decoded time T2 has to be a start time (which is defined as a slave start time) of the slave Bluetooth speaker 120 starting decoding the digital compression audio CS. Similarly, when the master decoded time T1 is a finish time of the master Bluetooth speaker 110 finishing decoding the digital compression audio CS, the slave decoded time T2 has to be a finish time (which is defined as a slave finish time) of the slave Bluetooth speaker 120 finishing decoding the digital compression audio CS.

For example, when the master decoded time T1 generated from the master audio decoder 114 is the master start time, the slave audio decoder 124 accordingly generates the slave start time indicating the slave decoded time T2. For clarity, in the instant disclosure, the following regards the master start time indicating the master decoded time T1 as the fifth second and regards the slave start time indicating the slave decoded time T2 as the third second. Next, the processor 123 receives the master decoded time T1 as the fifth second and the slave decoded time T2 as the third second. Then the processor 123 determines that the time difference between the master decoded time T1 and the slave decoded time T2 is +2 seconds, i.e., the master decoded time T1 is 2 seconds later than the slave decoded time T2. Next, the processor 123 generates the compensated signal MOD indicating the time difference being +2 seconds to the compensation element 125, so that the compensation element 125 gradually decreases the time difference between the master decoded time T1 and the slave decoded time T2.

The compensation element 125 receives the compensated signal MOD and the slave decoded audio DC2 to adjust the slave decoded audio DC2 based on the compensated signal MOD and accordingly generates a compensated audio MA indicating the compensated slave decoded audio DC2. The time of the compensation element 125 outputting the compensated audio MA is gradually same as the time of the master audio decoder 114 outputting the master decoded audio DC1. So that the compensated audio MA gradually synchronizes the master decoded audio DC1.

For example, the slave decoded audio DC2 is composed of many audio samples, i.e., the slave decoded audio DC2 can be separated into many audio packets. Therefore, when the processor 123 determines the time difference indicating the slave decoded time DC2 being later than the master decoded time DC1, the compensation element 125 decreases at least one audio sample of the slave decoded audio DC2 based on the compensated signal MOD. The time of the compensation element 125 outputting the compensated audio MA is gradually same as the time of the master audio decoder 114 outputting the master decoded audio DC1. So that the compensated audio MA indicating the compensated slave decoded audio DC2 gradually synchronizes the master decoded audio DC1.

Similarly, when the processor 123 determines the time difference indicating the slave decoded time DC2 being ahead of the master decoded time DC1, the compensation element 125 increases at least one audio sample into the slave decoded audio DC2 based on the compensated signal MOD. The time of the compensation element 125 outputting the compensated audio MA is gradually same as the time of the master audio decoder 114 outputting the master decoded audio DC1. So that the compensated audio MA indicating the compensated slave decoded audio DC2 gradually synchronizes the master decoded audio DC1. Certainly, the compensation element 125 can adjust the data length of the slave decoded audio DC2 by other methods. For example, the compensation element 125 adds/deletes the last data of the slave decoded audio DC2 or adds/deletes the master data of the slave decoded audio DC2, until the time of the compensation element 125 outputting the compensated audio MA is same as the time of the master audio decoder 114 outputting the master decoded audio DC1. The instant disclosure is not limited thereto.

The slave D/A converter 126 is electrically connected between the compensation element 125 and the slave sound output element 128. The slave D/A converter 126 receives the compensated audio MA and analogizes the compensated audio MA to generate the slave signal AU2 indicating the analog compensated audio MA. Then the slave sound output element 128 receives and plays the slave sound signal AU2 to play the sound corresponding to the slave sound signal AU2. Generally, the procedures of the slave D/A converter 216 analogizing the slave decoded audio DC2 and the slave sound output element 128 playing the sound are executed after the speaker decodes the sound signal. Those skilled in the art shall know the implementation of the slave D/A converter 126 and the slave sound output element 128, and further descriptions are hereby omitted.

Therefore, when the master Bluetooth speaker 110 analogizes the master decoded audio DC1, the slave Bluetooth speaker 120 simultaneously analogizes the compensated audio MA to synchronously play the analog master decoded audio DC1 and the analog compensated audio MA. More specifically, when the master D/A converter 116 and the master sound output element 118 transform the master decoded audio DC1 into the master sound signal AU1, the slave D/A converter 126 and the slave sound output element 128 simultaneously transform the slave decoded audio DC2 into the slave sound signal AU2 to synchronously play the master sound signal AU1 and the slave sound signal AU2.

Figure 3A:
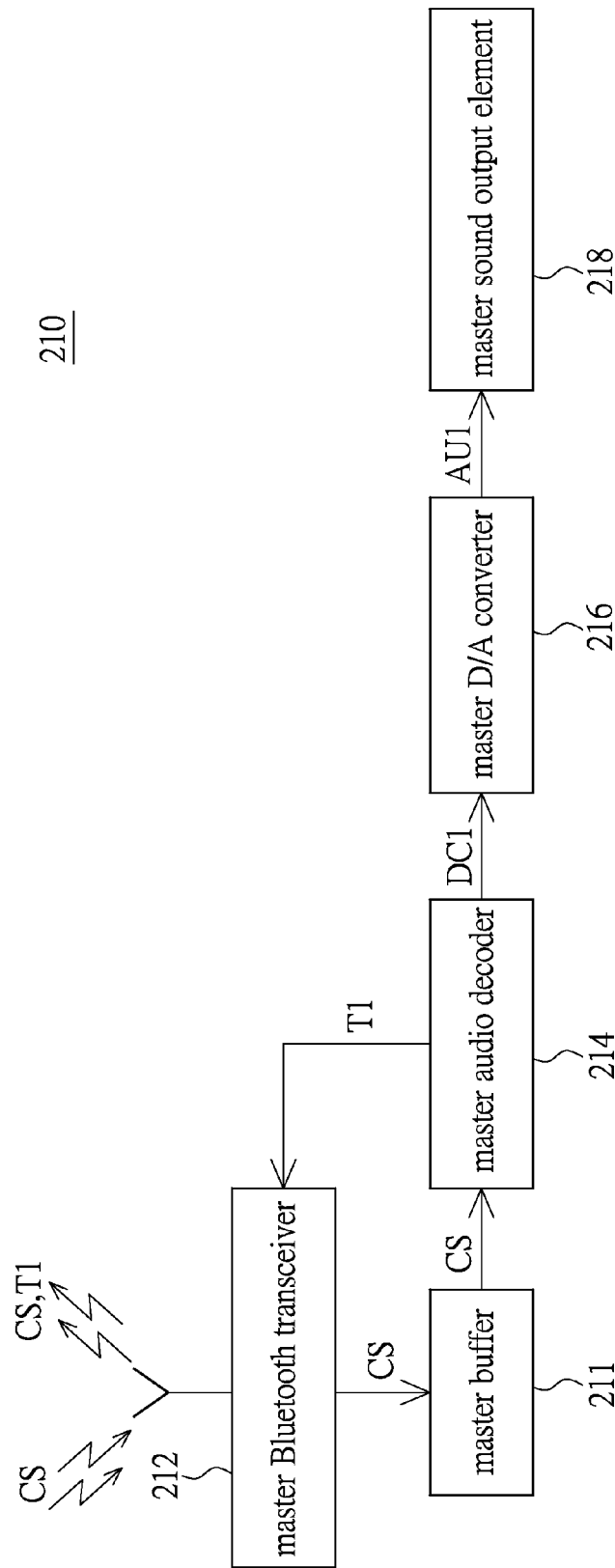
FIG. 3A is a schematic view of a master Bluetooth speaker according to another exemplary embodiment of the instant disclosure.
Figure 3B:
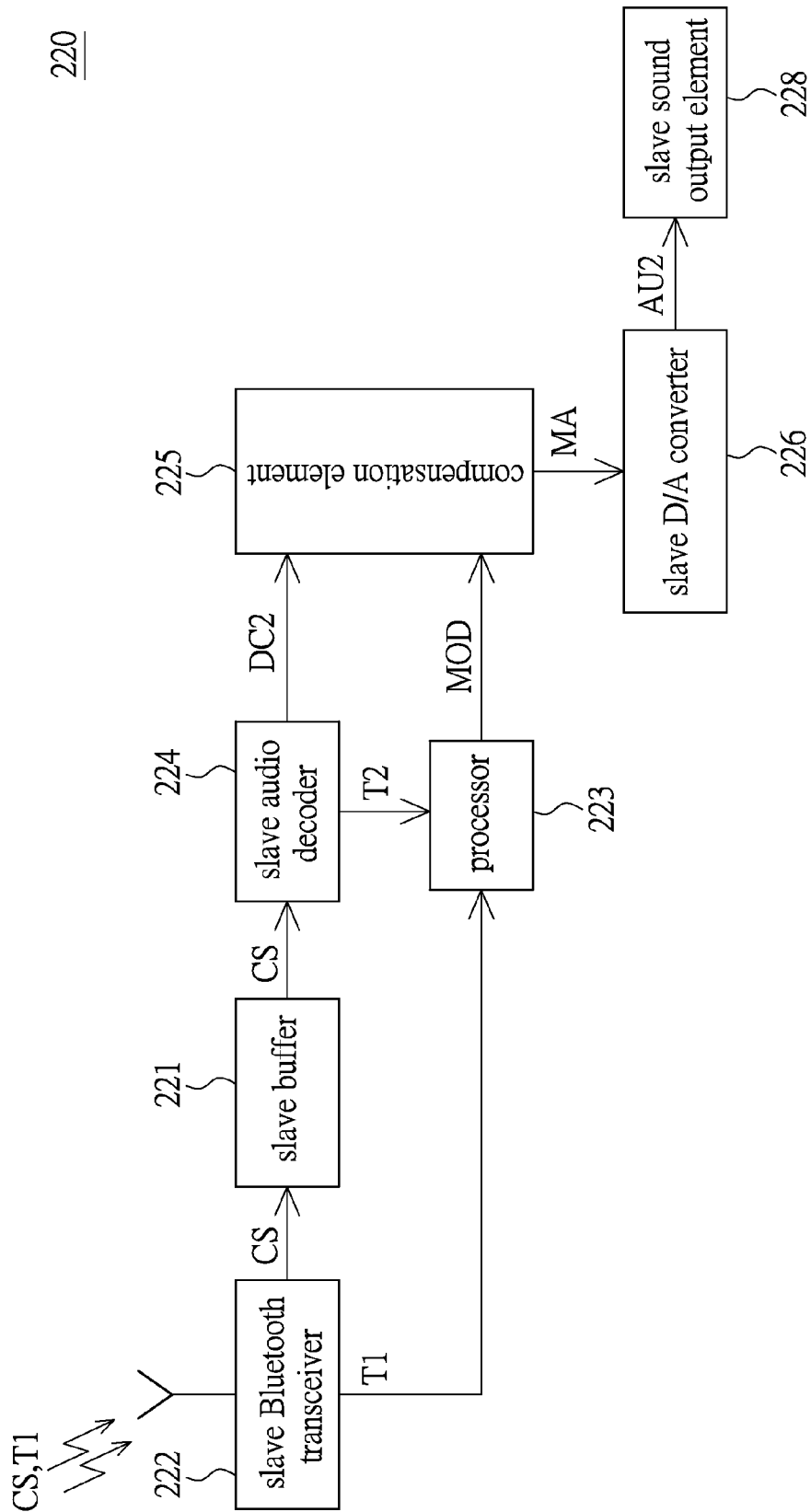
FIG. 3B is a schematic view of a slave Bluetooth speaker according to another exemplary embodiment of the instant disclosure.

Next, please refer to FIG. 3A and FIG. 3B in conjunction with FIG. 2A and FIG. 2B. Compared the disclosure in FIGS. 3A-3B with the disclosure in FIGS. 2A-2B, the master Bluetooth speaker 210 of the instant disclosure, further includes a master buffer 211. The master buffer 211 is electrically connected between the master Bluetooth transceiver 212 and the master audio decoder 214. The master buffer 211 is configured for buffering the digital compression audio CS by the master Bluetooth transceiver 212 for a period of time (which is defined as a master memory time) to avoid the data, which cannot be received in real-time by the interference from the wireless environment. The master buffer 211 transmits the digital compression audio CS to the master audio decoder 214 after the master memory time, so that the master audio decoder 214 receives and decodes the digital compression audio CS.

Similarly, the slave Bluetooth speaker 220 of the instant disclosure further includes a slave buffer 221. The slave buffer 221 is electrically connected between the slave Bluetooth transceiver 222 and the slave audio decoder 224. The slave buffer 221 is configured for buffering the digital compression audio CS by the slave Bluetooth transceiver 222 for a period of time (which is defined as a slave memory time) to avoid the data, which cannot be received in real-time, by the interference from the wireless environment. The slave buffer 221 transmits the digital compression audio CS to the slave audio decoder 224 after the slave memory time, so that the slave audio decoder 224 receives and decodes the digital compression audio CS.

The structures and the connection relationships among the master Bluetooth transceiver 212, the master audio decoder 214, the master D/A converter 216, and the master sound output element 218 of the master Bluetooth speaker 210 in FIG. 3A are same as those among the master Bluetooth transceiver 112, the master audio decoder 114, the master D/A converter 116, and the master sound output element 118 of the master Bluetooth speaker 110 in FIG. 2A, and further descriptions are hereby omitted. Similarly, The structures and the connection relationships among the slave Bluetooth transceiver 222, the slave audio decoder 224, the slave D/A converter 226, and the slave sound output element 228 of the slave Bluetooth speaker 220 in FIG. 3B are same as those among the slave Bluetooth transceiver 122, the slave audio decoder 124, the slave D/A converter 126, and the slave sound output element 128 of the slave Bluetooth speaker 120 in FIG. 2B, and further descriptions are hereby omitted.

Figure 4:
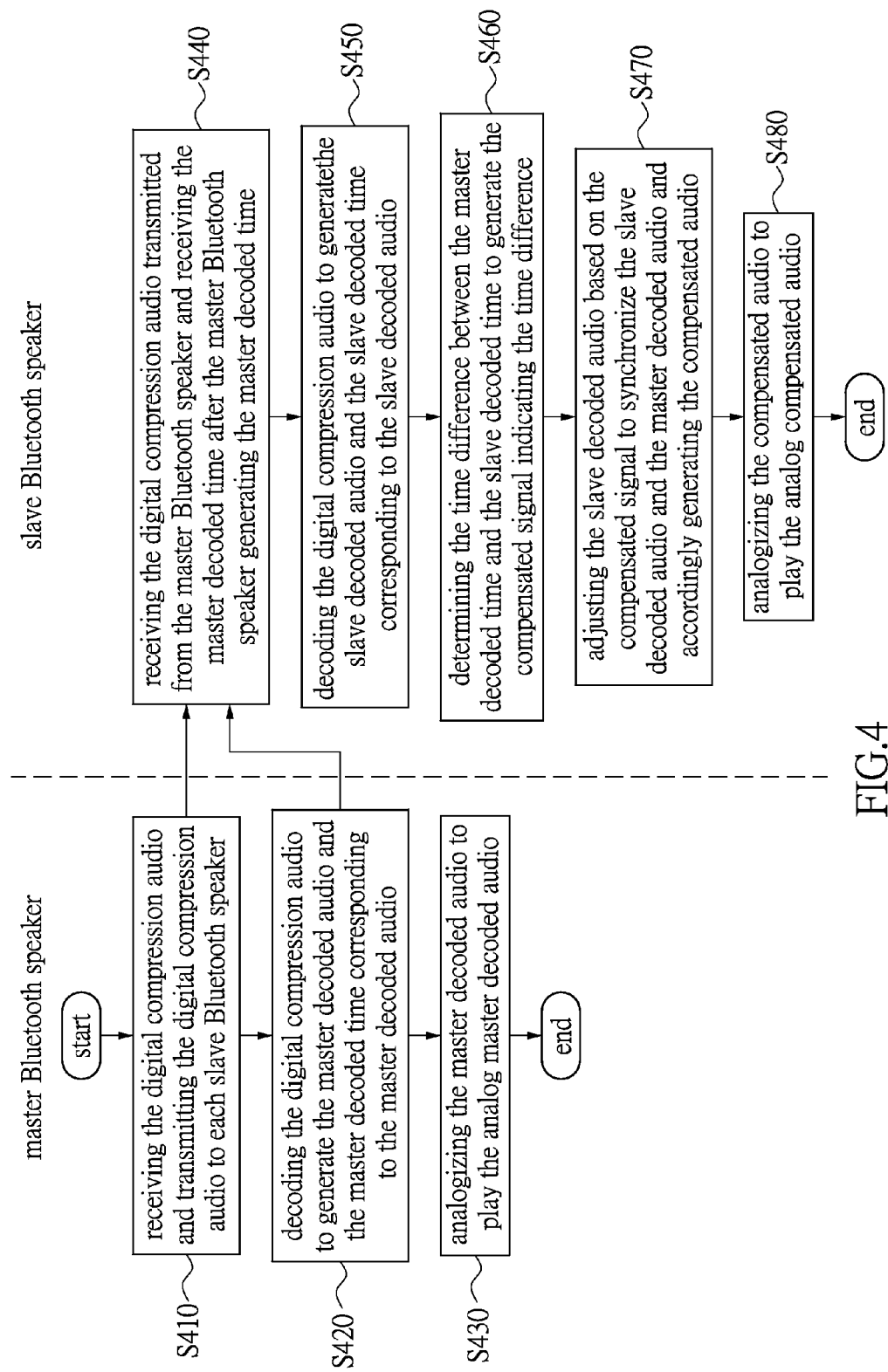
FIG. 4 is a flow diagram of an audio playing method with a Bluetooth function according to an exemplary embodiment of the instant disclosure.

From the aforementioned exemplary embodiments, the instant disclosure may generalize an audio playing method with a Bluetooth function, which is adapted for the aforementioned audio player 100. Please refer to FIG. 4 in conjunction with FIGS. 2A-2B. For the master Bluetooth speaker 110, firstly, the master Bluetooth speaker 100 receives the digital compression audio CS and transmits the digital compression audio CS to many slave Bluetooth speakers 120. In the instant disclosure, the digital compression audio CS is provided from the external Bluetooth audio player (e.g., a smartphone or a music player with the Bluetooth function). Besides, the master Bluetooth speaker 110 buffers the digital compression audio CS for a period of time (which is defined as a master memory time) after receiving the digital compression audio CS. Then the master Bluetooth speaker 110 decodes the digital compression audio CS after the master memory time to avoid the data, which cannot be received in real-time, by the interference from the wireless environment (Step S410).

Afterward the master Bluetooth speaker 100 decodes the digital compression audio CS to generate the master decoded audio DC1 and the master decoded time T1 corresponding to the master decoded audio DC1 (Step S420). Next, the master Bluetooth speaker 100 analogizes the master decoded audio DC1 to generate the master sound signal AU1 indicating the analog master decoded audio DC1, thereby playing the master sound signal AU1, i.e., playing the sound corresponding to the master sound signal AU1 (Step S430).

For the slave Bluetooth speaker 120, firstly, each of the slave Bluetooth speakers 120 receives the digital compression audio CS transmitted from the master Bluetooth speaker 110. Then each slave Bluetooth speaker 120 receives the master decoded time T1 after the master Bluetooth speaker 110 generates the master decoded time T1. In this step, the slave Bluetooth speaker 120 buffers the digital compression audio CS for a period of time (which is defined as a slave memory time) after receiving the digital compression audio CS. Then the slave Bluetooth speaker 120 decodes the digital compression audio CS after the slave memory time to avoid the data, which cannot be received in real-time, by the interference from the wireless environment (Step S440). In this step, the timing of the master Bluetooth speaker 110 generating the master decoded time T1 is illustrated in the master audio decoder 114 of the master Bluetooth speaker 110 of the aforementioned exemplary embodiments, so their detailed description is omitted.

Each of the slave Bluetooth speakers 120 decodes the digital compression audio CS after receiving the digital compression audio CS to generate the slave decoded audio DC2 and the slave decoded time T2 corresponding to the slave decoded audio DC2 (Step S450). In this step, there is a corresponding relationship between master decoded time T1 and the slave decoded time T2. Moreover, the corresponding relationship between master decoded time T1 and the slave decoded time T2 is illustrated in the processor 123 of the aforementioned exemplary embodiments, so their detailed description is omitted.

Afterward each of the slave Bluetooth speaker 120 further determines the time difference between the master decoded time T1 and the slave decoded time T2 after obtaining the master decoded time T1 and the slave decoded time T2 to generate the compensated audio MOD indicating the time difference (Step S460). In this step, the implementation method for determining the time difference between the master decoded time T1 and the slave decoded time T2 is illustrated in the processor 123 of the slave Bluetooth speaker 120 of the aforementioned exemplary embodiments, so their detailed description is omitted.

Then each of the slave Bluetooth speakers 120 adjusts the slave decoded audio DC2 based on the corresponding compensated signal MOD. The time of outputting the compensated audio MA is gradually same as the time of outputting the master decoded audio DC1. So that the compensated audio MA gradually synchronizes the master decoded audio DC1 (Step S470). Lastly, each of the slave Bluetooth speakers 120 analogizes the compensated audio MA to generate the slave sound signal AU2 indicating the analog compensated audio MA, thereby playing the slave sound signal AU2, i.e., playing the sound corresponding to the slave sound signal AU2.

Therefore, when the master Bluetooth speaker 110 analogizes the master decoded audio DC1, the slave Bluetooth speaker 120 simultaneously analogizes the compensated audio MA to synchronously play the analog master decoded audio DC1 and the analog compensated audio MA. More specifically, when the master Bluetooth speaker 110 transforms the master decoded audio DC1 into the master sound signal AU1, the slave Bluetooth speaker 120 simultaneously transforms the slave decoded audio DC2 into the slave sound signal AU2 to synchronously play the master sound signal AU1 and the slave sound signal AU2.

In summary, the exemplary embodiments of the instant disclosure provide the audio player with the Bluetooth function and the audio playing method thereof. The processor of the slave Bluetooth speaker determines the time difference between the master decoded time and the slave decoded time, to further adjust the timing of each slave Bluetooth speaker playing the sound. So that the timing of each slave Bluetooth speaker playing the sound gradually synchronizes the timing of the master Bluetooth speaker playing the sound. Accordingly, the sound playing from the master Bluetooth speaker and the slave Bluetooth speaker does not have the obvious asynchronization.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An audio player with a Bluetooth function, comprising:
   a master Bluetooth speaker, configured for having a Bluetooth field, receiving a digital compression audio, and decoding the digital compression audio to generate a master decoded audio and a master decoded time corresponding to the master decoded audio;
   a plurality of slave Bluetooth speakers, disposed in the Bluetooth field to receive the digital compression audio transmitted from the master Bluetooth speaker and receiving the master decoded time after the master Bluetooth speaker generating the master decoded time, wherein each slave Bluetooth speaker decodes the digital compression audio to generate a slave decoded audio and a slave decoded time corresponding to the slave decoded audio, and each slave Bluetooth speaker comprises:
      a processor, configured for receiving the master decoded time and the slave decoded time and determining a time difference between the master decoded time and the slave decoded time to generate a compensated signal indicating the time difference; and
      a compensation element, electrically connected to the processor and configured for receiving the compensated signal and the slave decoded audio, wherein the compensation element adjusts the slave decoded audio based on the compensated signal to synchronize the slave decoded audio and the master decoded audio and accordingly generates a compensated audio;
   wherein when the master Bluetooth speaker analogizes the master decoded audio to play the analog master decoded audio, the slave Bluetooth speaker analogizes the compensated audio to synchronously play the analog compensated audio.

2. The audio player according to claim 1, wherein the master Bluetooth speaker comprises:
   a master audio decoder, configured for receiving the digital compression audio by a master Bluetooth transceiver and decoding the digital compression audio to generate the master decoded audio and the master decoded time, and outputting the master decoded time by the master Bluetooth transceiver after generating the master decoded time;
   a master digital to analog (D/A) converter, electrically connected to the master audio decoder, wherein the master D/A converter receives the master decoded audio and analogizes the master decoded audio to generate a master sound signal indicating the analog master decoded audio; and
   a master sound output element, electrically connected to the master D/A converter and configured for receiving and playing the master sound signal.

3. The audio player according to claim 2, wherein the master Bluetooth speaker comprises:
   a master buffer, electrically connected between the master Bluetooth transceiver and the master audio decoder, the master buffer configured for buffering the digital compression audio by the master Bluetooth transceiver and transmitting the digital compression audio to the master audio decoder.

4. The audio player according to claim 1, wherein each slave Bluetooth speaker comprises:
   a slave audio decoder, electrically connected to the compensation element and the processor, and configured for receiving the digital compression audio transmitted from the master Bluetooth transceiver by a slave Bluetooth transceiver and decoding the digital compression audio to generate the slave decoded audio to the compensation element and generate the slave decoded time to the processor;
   a slave digital to analog (D/A) converter, electrically connected to the compensation element, wherein the slave D/A converter receives the compensated audio and analogizes the compensated audio to generate a slave sound signal indicating the analog compensated audio; and
   a slave sound output element, electrically connected to the slave D/A converter and configured for receiving and playing the slave sound signal.

5. The audio player according to claim 4, wherein each slave Bluetooth speaker comprises:
   a slave buffer, electrically connected between the slave Bluetooth transceiver and the slave audio decoder, the slave buffer configured for buffering the digital compression audio by the master Bluetooth transceiver and transmitting the digital compression audio to the slave audio decoder.

6. The audio player according to claim 1, wherein the slave decoded audio is composed of a plurality of audio samples, and when the processor determines the time difference indicating the slave decoded time being later than the master decoded time, the compensation element decreases at least one audio sample of the slave decoded audio to synchronize the slave decoded audio and the master decoded audio.

7. The audio player according to claim 1, wherein the slave decoded audio is composed of a plurality of audio samples, and when the processor determines the time difference indicating the slave decoded time being ahead of the master decoded time, the compensation element increases at least one audio sample into the slave decoded audio to synchronize the slave decoded audio and the master decoded audio.

8. The audio player according to claim 1, wherein the master Bluetooth speaker generates the master decoded time after the master Bluetooth speaker decodes the digital compression audio.

9. The audio player according to claim 1, wherein each slave Bluetooth speaker returns an acknowledged signal to the master Bluetooth speaker after the master Bluetooth speaker transmits the digital compression audio or the master decoded time to the slave Bluetooth speakers, wherein each acknowledged signal indicates whether the corresponding slave Bluetooth speaker receives the digital compression audio or the master decoded time.

10. The audio player according to claim 1, wherein the master decoded time indicates that a master start time of the master Bluetooth speaker starting decoding the digital compression audio or a master finish time of the master Bluetooth speaker finishing decoding the digital compression audio.

11. The audio player according to claim 10, wherein when the master decoded time is the master start time, the slave decoded time indicates that a slave start time of the slave Bluetooth speaker starting decoding the digital compression audio, and when the master decoded time is the master finish time, the slave decoded time indicates that a slave finish time of the slave Bluetooth speaker finishing decoding the digital compression audio.

12. An audio playing method with a Bluetooth function, adapted for an audio player with the Bluetooth function, which has a master Bluetooth speaker and a plurality of slave Bluetooth speakers, the master Bluetooth speaker having a Bluetooth field and the slave Bluetooth speakers disposed in the Bluetooth field, and the audio playing method comprising:
  receiving a digital compression audio and transmitting the digital compression audio to the slave Bluetooth speakers in the master Bluetooth speaker;
  decoding the digital compression audio to generate a master decoded audio and a master decoded time corresponding to the master decoded audio in the master Bluetooth speaker;
  receiving the digital compression audio transmitted from the master Bluetooth speaker and receiving the master decoded time after the master Bluetooth speaker generating the master decoded time in each slave Bluetooth speaker;
  decoding the digital compression audio to generate a slave decoded audio and a slave decoded time corresponding to the slave decoded audio in each slave Bluetooth speaker;
  determining a time difference between the master decoded time and the slave decoded time to generate a compensated signal indicating the time difference in each slave Bluetooth speaker; and
  adjusting the slave decoded audio based on the compensated signal to synchronize the slave decoded audio and the master decoded audio, and accordingly generating a compensated audio in each slave Bluetooth speaker;
  wherein when the master Bluetooth speaker analogizes the master decoded audio to play the analog master decoded audio, the slave Bluetooth speaker analogizes the compensated audio to synchronously play the analog compensated audio.

13. The audio playing method according to claim 12, wherein after the step of receiving the digital compression audio in the master Bluetooth speaker, further comprises:
  buffering the digital compression audio and decoding the digital compression audio.

14. The audio playing method according to claim 12, wherein after the step of receiving the digital compression audio in each slave Bluetooth speaker, further comprises:
  buffering the digital compression audio and
  decoding the digital compression audio.

15. The audio playing method according to claim 12, wherein the slave decoded audio is composed of a plurality of audio samples, and when determining the time difference indicating the slave decoded time being later than the master decoded time in each slave Bluetooth speaker, decreasing at least one audio sample of the slave decoded audio based on the compensated signal to synchronize the slave decoded audio and the master decoded audio.

16. The audio playing method according to claim 12, wherein the slave decoded audio is composed of a plurality of audio samples, and when determining the time difference indicating the slave decoded time being ahead of the master decoded time in each slave Bluetooth speaker, increasing at least one audio sample into the slave decoded audio based on the compensated signal to synchronize the slave decoded audio and the master decoded audio.

17. The audio playing method according to claim 12, wherein after the step of decoding the digital compression audio in the master Bluetooth speaker, further comprises:
  generating the master decoded time in the master Bluetooth speaker.

18. The audio playing method according to claim 12, wherein after the step of transmitting the digital compression audio or the master decoded time to the slave Bluetooth speakers in the master Bluetooth speaker, further comprises:
  each slave Bluetooth speaker returns an acknowledged signal to the master Bluetooth speaker, wherein each acknowledged signal indicates whether the corresponding slave Bluetooth speaker receives the digital compression audio or the master decoded time.

19. The audio playing method according to claim 12, wherein the master decoded time indicates that a master start time of the master Bluetooth speaker starting decoding the digital compression audio or a master finish time of the master Bluetooth speaker finishing decoding the digital compression audio.

20. The audio playing method according to claim 19, wherein when the master decoded time is the master start time, the slave decoded time indicates that a slave start time of the slave Bluetooth speaker starting decoding the digital compression audio, and when the master decoded time is the master finish time, the slave decoded time indicates that a slave finish time of the slave Bluetooth speaker finishing decoding the digital compression audio.

* * * * *